(12) United States Patent
Han et al.

(10) Patent No.: US 7,271,565 B2
(45) Date of Patent: Sep. 18, 2007

(54) APPARATUS FOR CONTROLLING SPEED OF FAN MOTOR OF AIR-CONDITIONER

(75) Inventors: Seung-Do Han, Incheon (KR); Hyoun-Jeong Shin, Incheon (KR); Seung-Suk Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/071,455

(22) Filed: Mar. 4, 2005

(65) Prior Publication Data

US 2006/0113950 A1 Jun. 1, 2006

(30) Foreign Application Priority Data

Nov. 15, 2004 (KR) .................. 10-2004-0093242

(51) Int. Cl.
*H02P 27/00* (2006.01)

(52) U.S. Cl. .................. 318/772; 318/767; 318/807

(58) Field of Classification Search ............... 318/772, 318/727, 700, 785, 538, 767, 807; 310/211
See application file for complete search history.

(56) References Cited

U.S. PATENT DOCUMENTS

| | | | |
|---|---|---|---|
| 3,573,577 A * | 4/1971 | Boyd ..................... | 318/718 |
| 4,038,589 A * | 7/1977 | Heyne et al. ............ | 318/718 |
| 4,453,101 A * | 6/1984 | Nelson .................. | 310/211 |
| 4,463,304 A * | 7/1984 | Miller .................. | 318/790 |
| 4,516,046 A * | 5/1985 | Mercier ................. | 310/154.11 |
| 4,566,289 A * | 1/1986 | Iizuka et al. ........... | 62/228.4 |
| 4,658,195 A * | 4/1987 | Min ..................... | 318/786 |
| 5,200,684 A * | 4/1993 | Fisher .................. | 318/809 |
| 5,280,227 A * | 1/1994 | Bashark ................. | 318/751 |
| 5,440,219 A * | 8/1995 | Wilkerson ............... | 318/802 |
| 5,589,753 A * | 12/1996 | Kadah et al. ............ | 318/785 |
| 5,982,342 A * | 11/1999 | Iwata et al. ............ | 345/7 |
| 6,346,790 B1 * | 2/2002 | Kemp et al. ............. | 318/813 |
| 6,504,338 B1 * | 1/2003 | Eichorn ................. | 318/727 |
| 6,784,634 B2 * | 8/2004 | Sweo .................... | 318/727 |
| 7,045,986 B2 * | 5/2006 | Anghel et al. ........... | 318/712 |
| 2004/0164695 A1 * | 8/2004 | Hallidy ................. | 318/538 |
| 2005/0231151 A1 * | 10/2005 | Ilda .................... | 318/785 |

FOREIGN PATENT DOCUMENTS

| | | |
|---|---|---|
| EP | 1 416 616 A | 5/2004 |
| EP | 1 455 435 A | 9/2004 |
| JP | 04 344190 A | 11/1992 |
| JP | 07 180895 A | 7/1995 |
| KR | 1997-0031215 | 6/1997 |

* cited by examiner

*Primary Examiner*—Rita Leykin
(74) *Attorney, Agent, or Firm*—Birch, Stewart, Kolasch & Birch, LLP

(57) ABSTRACT

An apparatus for controlling a speed of a fan motor (HIM (Hybrid Induction Motor)) of an air-conditioner extends a speed control range of a fan motor of an air-conditioner by controlling revolutions per minute (RPM) of the fan motor. In order to extend the speed control range of the HIM, an RPM of the HIM is controlled based on a pre-set duty ratio of a switching device electrically connected with the HIM.

29 Claims, 4 Drawing Sheets

APPARATUS FOR CONTROLLING SPEED OF FAN MOTOR OF AIR-CONDITIONER

BACKGROUND OF THE INVENTION

1. Field of the Invention

The present invention relates to an air-conditioner and, more particularly, to an apparatus for controlling a speed of a fan motor of an air-conditioner.

2. Description of the Conventional Art

In general, a single-phase induction motor is used as a fan motor of an air-conditioner. In order to generate rotating torque, the single-phase induction motor supplies a magnetizing current generating a rotating field and an induced current generated from a rotor to windings connected with an external power terminal.

The single-phase induction motor has a limitation in enhancing efficiency due to a primary copper loss of a stator and a secondary copper loss of the rotor.

In order to resolve such limitation, recently, a HIM (Hybrid Induction Motor) as shown in FIGS. 1 and 2 is used as a fan motor of the air-conditioner.

FIG. 1 is a schematic sectional view of the HIM in accordance with a conventional art, and FIG. 2 is a schematic sectional top view taken along line B-B' of the HIM of FIG. 1.

As shown in FIGS. 1 and 2, a bracket 104 of the conventional HIM 100 includes a stator 105 and an induction rotor 101 installed at an inner side of the stator 105. A plurality of slots 108 are protrusively formed at an inner side of the stator 105 and coils 103 for applying a current are wound at the slots 108.

Aluminum rotor bars 112 are vertically inserted into a plurality of air gaps formed in an up/down direction at an edge of the rotor 101, and the aluminum rotor bars 112 are connected by an end ring 102.

A rotating shaft 109 for transferring a rotational force of the rotor 101 to outside is installed in an air gap 110 formed at the center of the induction rotor 101. The rotating shaft 109 can be rotated by an oilless bearing 107 installed at the bracket 104.

A permanent magnet rotor 106 for rotating the rotor 101 with a strong magnetic flux while being rotated by rotating field generated from the stator 105 is installed between the stator 105 and the induction rotor 101.

When an AC voltage is applied to the conventional HIM, the permanent magnet rotor 106 is rotated by the current applied to the coil 103 of the stator 105, and the rotating permanent magnet rotor 106 generates a rotating field with strong magnetic flux, to rotate the induction rotator 101. At this time, the permanent magnet rotor 106 in a low inertia state is separated from a fan (not shown) and rotated owing to the rotating field of the stator 105, and as a torque generating magnetic flux is supplied to the induction rotor 101 owing to the rotating field of the permanent magnet rotor 10, the induction rotor 101 is rotated.

In other words, when the permanent magnet rotor 106 is rotated by the rotating field in an oval form generated from the stator of the distributed windings, the permanent magnet rotor 106 generates rotating field with strong magnetic flux to make the induction rotor 101 rotated, so that the HIM is operated with high efficiency and low noise.

Velocity characteristics of the conventional apparatus for controlling a speed of the fan motor of the air-conditioner and a general induction motor will now be described with reference to FIGS. 3 and 4.

FIG. 3 is a circuit diagram showing the construction of the apparatus for controlling a speed of the fan motor (HIM) in accordance with the conventional art, and FIG. 4 is a graph showing speed characteristics of the conventional HIM and a general induction motor.

As shown in FIG. 3, when the apparatus for controlling a rotational speed of the fan motor by controlling a phase of a voltage applied to the fan motor (HIM) through one triac is applied for the HIM, a speed control range (i.e., 790~880 RPM (revolution per minute) according to the voltage is limited as shown in FIG. 4. Namely, the speed control range is limited to the 790~880 RPM(880 RPM−790 RPM=90 RPM) due to the permanent magnet rotor 106. This causes a problem that the conventional apparatus for controlling the speed of the fan motor cannot be applied for air-conditioner which requires a speed control range or above 100 RPM.

U.S. Pat. No. 6,819,026 issued on Nov. 16, 2004 also discloses an induction motor used as a fan motor of an air-conditioner.

SUMMARY OF THE INVENTION

Therefore, an object of the present invention is to provide an apparatus for controlling a speed of a fan motor of an air-conditioner capable of extending a speed control range of a fan motor of an air-conditioner by controlling revolutions per minute (RPM) of the fan motor.

To achieve these and other advantages and in accordance with the purpose of the present invention, as embodied and broadly described herein, there is provided an apparatus for controlling a speed of a HIM (Hybrid Induction Motor) in which in order to extend a speed control range of the HIM, an RPM of the HIM is controlled based on a pre-set duty ratio of a switching device electrically connected with the HIM.

To achieve the above object, there is also provided an apparatus for controlling a speed of a fan motor of an air-conditioner with a fan motor having a stator, an induction rotor and a permanent magnet rotor installed between the stator and the induction rotor, including: a controller for generating a predetermined duty ratio control signal corresponding to a rotation request signal for rotating the fan motor inputted by a user; and a switching device for controlling the RPM of the fan motor by controlling a voltage applied to the fan motor according to the duty ratio control signal, wherein the duty ratio control signal controls a turn-on time and a turn-off time of the switching device.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Several times of trial and error and experimentation have revealed that an apparatus for controlling a speed of a fan motor of an air-conditioner in accordance with the present invention can more effectively extend a speed control range when it is applied for a HIM (Hybrid Induction Motor) than applied for a general induction motor.

An apparatus for controlling a speed of a fan motor of an air-conditioner capable of extending a speed control range of the fan motor (HIM) by controlling an average of an RPM (Revolutions Per Minute) of the fan motor of an air-conditioner in accordance with a preferred embodiment of the present invention will be described in detail with reference to FIGS. 4 and 5.

Figure 1:
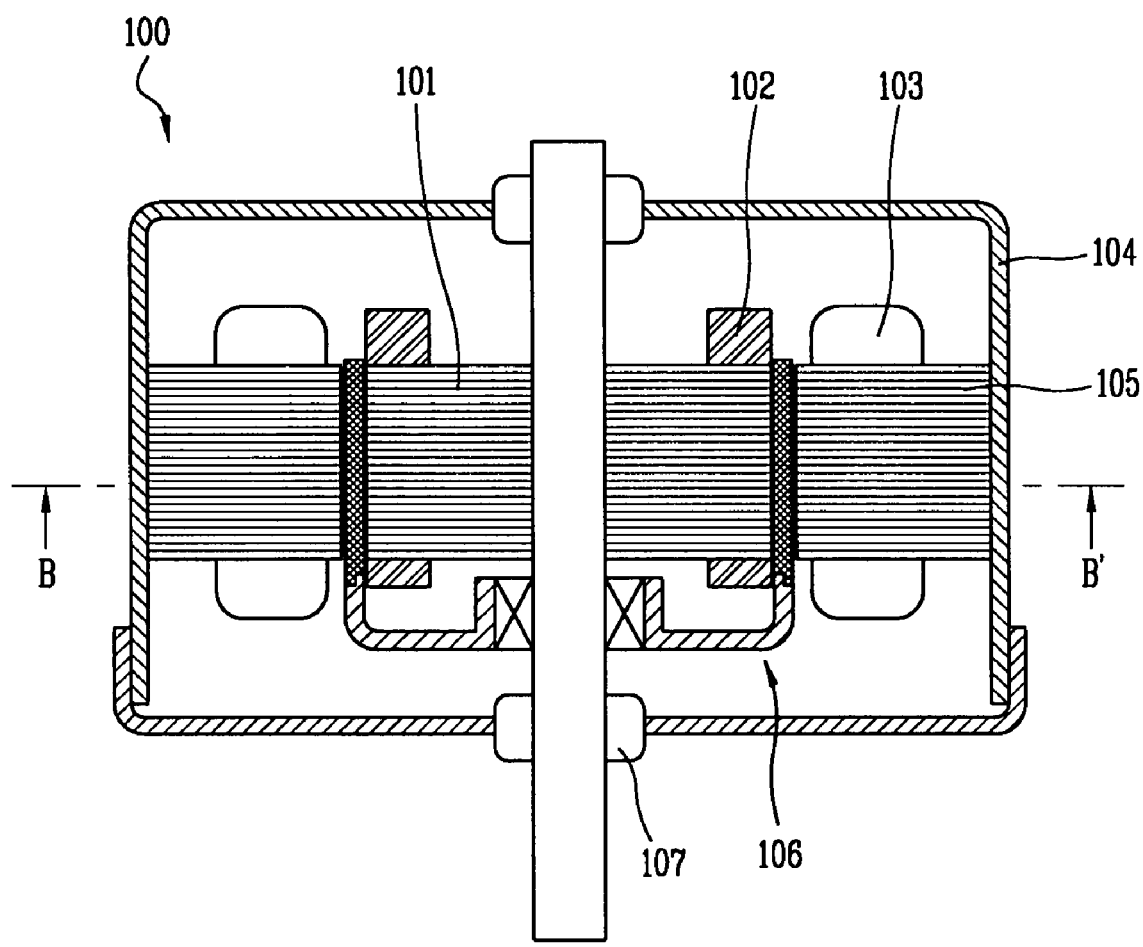
FIG. 1 is a schematic sectional view of a HIM in accordance with a conventional art.
Figure 2:
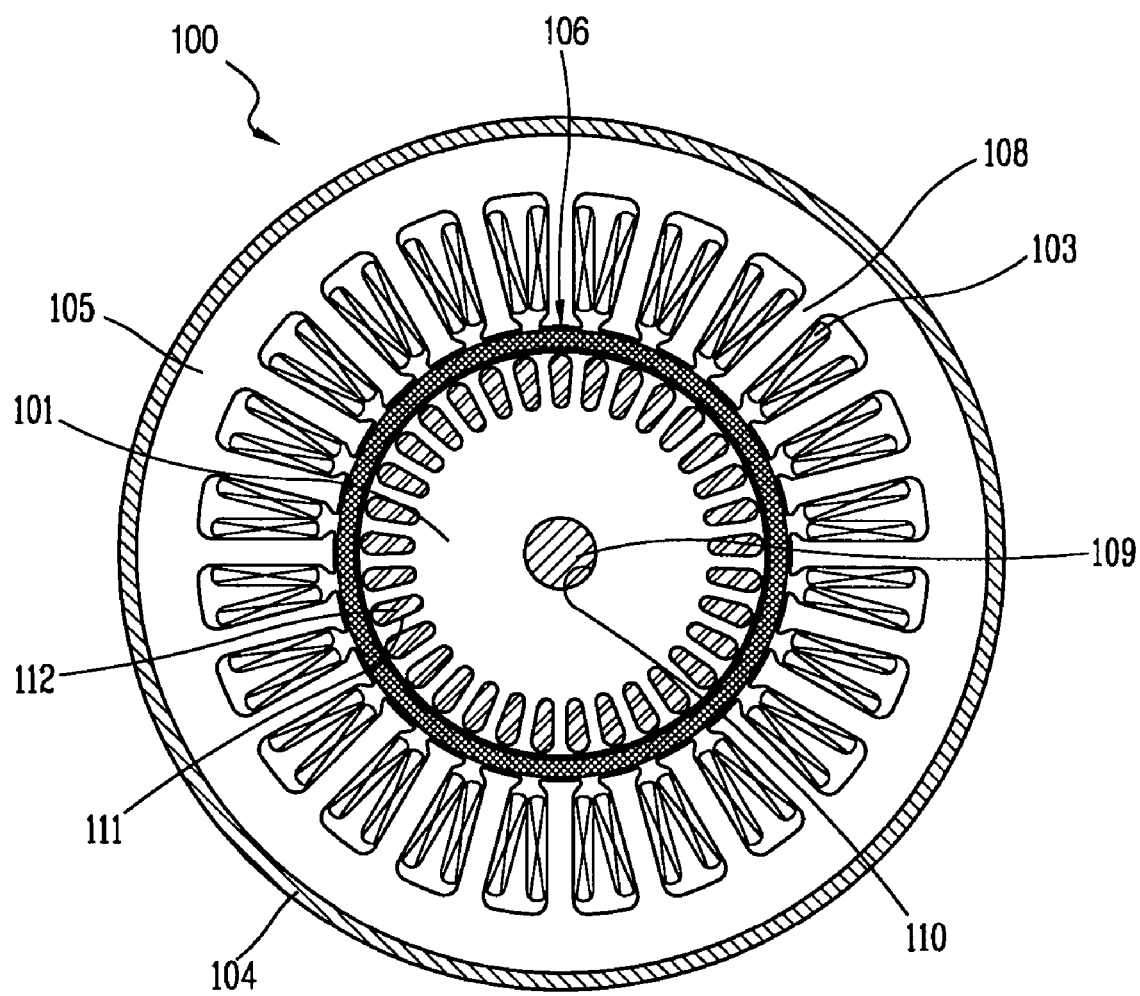
FIG. 2 is a schematic top view taken along line B-B' of the HIM of FIG. 1.
Figure 3:
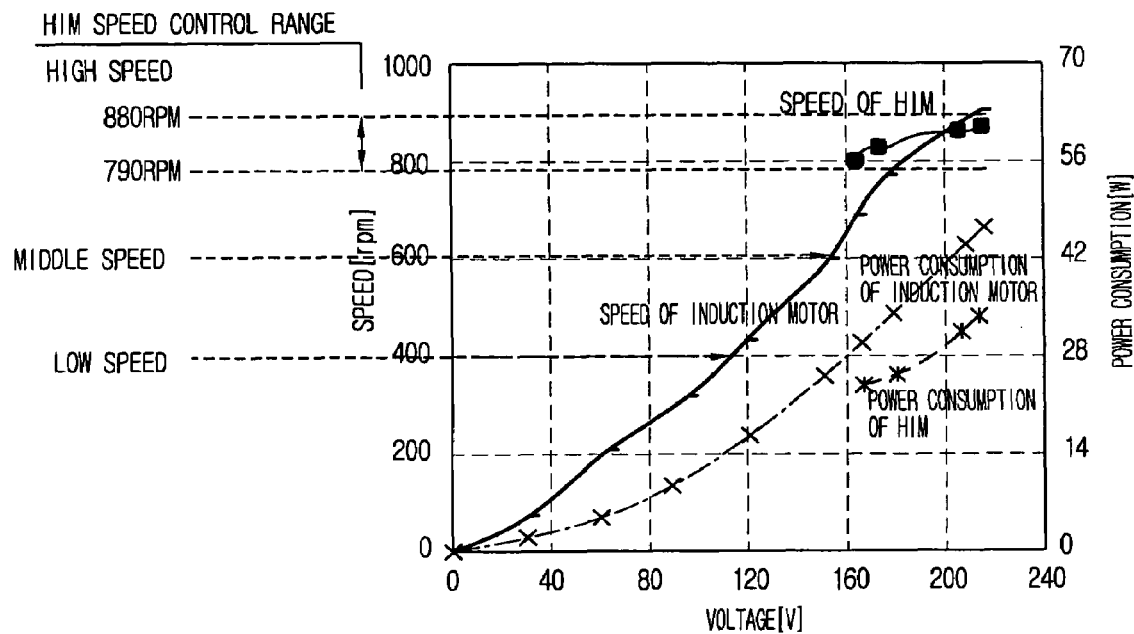
FIG. 3 is a graph showing speed characteristics of the HIM in accordance with the conventional art and a general induction motor.
Figure 4:
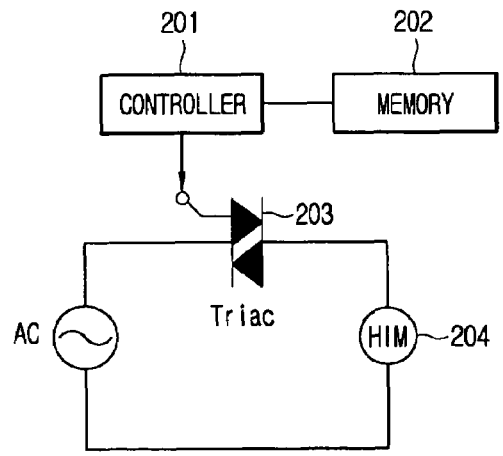
FIG. 4 is a block diagram showing the construction of an apparatus for controlling a speed of a fan motor of an air-conditioner in accordance with the present invention.

FIG. 4 is a block diagram showing the construction of an apparatus for controlling a speed of a fan motor of an air-conditioner in accordance with the present invention.

As shown in FIG. 4, the apparatus for controlling a speed of the fan motor of the air-conditioner includes: a controller 201 for generating a predetermined duty ratio control signal corresponding to a rotation request signal for rotating the fan motor (HIM) 204 inputted by a user; and a triac 203 for controlling the RPM of the fan motor by controlling a voltage applied to the fan motor according to the duty ratio control signal, in order to extend a speed control range of the fan motor 204.

Preferably, a memory 202 for storing pre-determined duty ratio control signals for controlling the RPM of the fan motor 204 is connected with the controller 201.

In the present invention, a switching device such as an inverter can be used in place of the triac 203.

The duty ratio control signal is a signal for controlling a rate of a turn-on time and a turn-off time of the triac 203 during one cycle. Namely, the duty ratio control signals turns on the triac 203 during a first pre-set time and turns off the triac 203 during a second pre-set time.

In other words, an average value of an RPM of the HIM 203 according to various duty ratio control signals is calculated, a duty ratio control signal corresponding to the calculated average value is stored in the memory 202, and then, the average value of the RPM of the fan motor 204 is controlled based on the stored duty ratio control signal, thereby extending a speed control range of the fan motor 204.

When a rotation request signal for increasing the RPM of the fan motor 204 is inputted, the controller 201 generates a duty ratio control signal for lengthening the turn-on time of the triac 203 and shortening the turn-off time. Preferably, the turn-off time does not exceed 1 second.

Meanwhile, when a rotation request signal for reducing the RPM of the fan motor is inputted, the controller generates a duty ratio control signal for shortening the turn-on time of the triac 203 and lengthening the turn-off time of the triac 203. Preferably, the turn-off time of the triac 203 does not exceed 1 second.

The operation of the apparatus for controlling the fan motor of the air-conditioner in accordance with the present invention will now be described in detail with reference to FIGS. 5A and 5B.

Figure 5A:
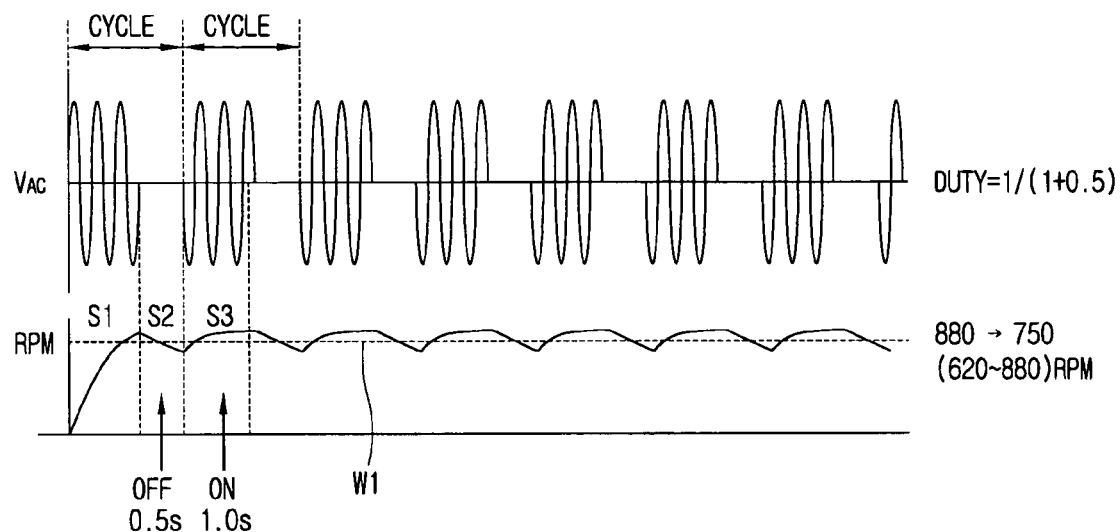
FIGS. 5A and 5B are graphs showing a voltage applied to the fan motor through an apparatus for controlling a speed of the fan motor of the air-conditioner and a rotation speed in accordance with the present invention.
Figure 5B:
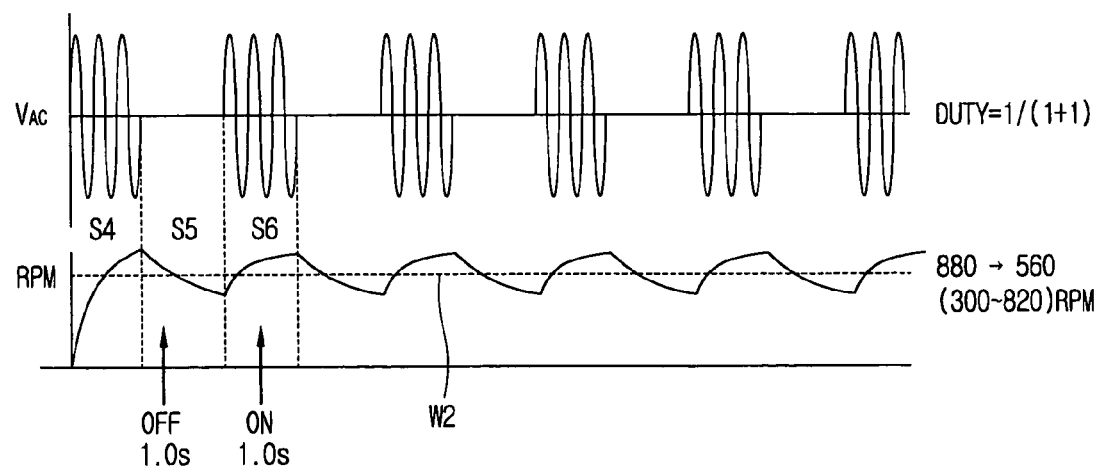

FIGS. 5A and 5B are graphs showing a voltage applied to the fan motor through an apparatus for controlling a speed of the fan motor of the air-conditioner and a rotation speed in accordance with the present invention.

First, when a rotation request signal for rotating the fan motor 204 is inputted by a user, the controller 201 outputs a predetermined duty ratio control signal corresponding to the rotation request signal to the triac 203.

With reference to FIG. 5A, when a rotation request signal for rotating the fan motor 204 at 750 RPM (W1) is inputted by the user, the controller 201 outputs a predetermined duty ratio control signal (e.g., duty ratio 1/(1+0.5) corresponding to the rotation request signal to the triac 203. For example, the controller 201 turns on the triac 203 for one second (the interval S1) to apply a voltage to the fan motor 204. Herein, when the triac 203 is turned on for an initial one second, the HIM 204 is rotated at maximum 880 RPM.

Thereafter, the controller 201 turns off the triac 203 for 0.5 seconds (the interval S2) in order to not apply the voltage to the HIM 204. In this case, because the voltage Vac is not supplied to the HIM 204 for 0.5 seconds, the RPM of the HIM 204 is reduced for 0.5 seconds. Herein, 0.5 seconds means time so long as for the HIM 204 not to be stopped from rotation in consideration of inertia of the HIM 204 and a mechanical time constant. An average RPM (the minimum RPM) of the HIM 204 during the interval S2 measured through experimentation was 620 RPM.

The controller 201 turns on the triac 203 for one second (interval S3) again to apply a voltage to the HIM 204 for one second. At this time, since the HIM 204 has been rotated at average 620 RPM according to inertia, the HIM 204 becomes rotated at average 880 RPM. An average RPM (the maximum RPM) of the HIM 204 during the interval S3 measured through experimentation was 880 RPM.

Accordingly, when the apparatus for controlling the speed is operated according to the duty ratio control signal (1/(1+0.5)), since the minimum RPM (i.e., the average RPM while the triac 203 is turned off for 0.5 seconds) of the HIM 204 measured through experimentation was 620 RPM and the maximum RPM (the average RPM while the triac 203 is turned on for one second) measured through experimentation was 880 RPM, an average value of the RPM of the fan motor (HIM) 204 is 750 RPM (620 RPM+880 RPM)/2).

With reference to FIG. 5B, when a rotation request signal for rotating the fan motor 204 at 560 RPM (W2) is inputted by the user, the controller 201 outputs a predetermined duty ratio control signal (e.g., duty ratio 1/(1+1) corresponding to the rotation request signal to the triac 203. Namely, the controller 201 turns on the triac 203 for one second (the interval S4) to apply a voltage to the HIM 204. In this case, when the triac 203 is turned on for initial one second, the HIM 204 is rotated at the maximum 880 RPM.

Thereafter, the controller 201 turns off the triac 203 for one second (the interval S5) in order not to apply the voltage to the HIM 204 for one second. Then, since the voltage Vac is not supplied to the HIM 204 for one second, the RPM of the HIM 204 is reduced for one second (the HIM is rotated by inertia). Herein, 1 second means time so long as for the HIM 204 not to be stopped from rotation in consideration of inertia of the HIM 204 and a mechanical time constant. An average RPM (the minimum RPM) of the HIM 204 during the interval S5 measured through experimentation was 300 RPM.

Thereafter, the controller 201 turns on the triac 203 for one second (the interval S6) to apply the voltage to the HIM 204. Then, the HIM 204 is rotated at an average 820 RPM. Namely, since the average RPM (300 RPM) of the HIM 204 during the interval S5 is smaller than the average RPM (620 RPM) during the interval S2, an average RPM (the maximum RPM) of the HIM 204 during the interval S6 measured through experimentation was 820 RPM.

Accordingly, when the apparatus for controlling the speed is operated according to the duty ratio control signal (1/(1+1), since the minimum RPM (the average RPM while the triac is turned on during one second) of the HIM 204 measured through experimentation was 300 RPM and the maximum RPM (the average RPM while the triac is turned on for one second) is 820 RPM, an average value of the RPM of the HIM 204 is 560 RPM (300 RPM+820 RPM)/2=560 RPM).

Consequently, by rotating the HIM 204 according to the various duty ratios of the triac, previously calculating an average value of the RPM of the HIM 204 and controlling the turn-one time/turn-off time of the triac 203 according to the duty ratio control signal corresponding to the previously calculated average value, the speed control range of the HIM 204 can be extended. For example, when the apparatus for controlling a speed of the fan motor of the air-conditioner is applied for the HIM 204, the speed control range of the fan motor of the air-conditioner includes 560, 750 and 880 RPM, the present invention can be applied for an air-conditioner which requires a speed control range of 100 RPM or above.

As so far described, the apparatus for controlling a speed of a fan motor of an air-conditioner in accordance with the present invention has such an advantage that the speed control range of the HIM can be extended by rotating the HIM based on a pre-set duty ratio of the triac and controlling an average value of the RPM of the rotated HIM.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling a speed of a HIM (Hybrid Induction Motor), comprising:
    a power supply for providing an AC voltage, the AC voltage having a plurality of cycles per predetermined time period; and
    a switching device electrically connected to the power supply and to the HIM, an average RPM (revolution per minute) of the HIM being controlled based on a periodic pre-set duty ratio of the switching device,
    wherein the switching device stops applying the AC voltage to the HIM for at least one of the plurality of cycles during a turn-off time of the periodic pre-set duty ratio of the switching device, thereby extending a speed control range of the HIM.

2. The apparatus of claim 1, wherein the switching device is a triac.

3. The apparatus of claim 1, wherein the switching device is an inverter.

4. The apparatus of claim 1, comprising:
    a controller for generating a predetermined periodic duty ratio control signal corresponding to a rotation request signal for rotating the HIM inputted by a user;
    wherein the switching device is a triac for controlling the RPM of the HIM by controlling the AC voltage applied to the HIM according to the periodic duty ratio control signal,
    wherein the periodic duty ratio control signal controls the turn-on time and the turn-off time of the switching device.

5. An apparatus for controlling a speed of a fan motor of an air-conditioner with a fan motor having a stator, an induction rotor and a permanent magnet rotor installed between the stator and the induction rotor, comprising:
    a power supply for providing an AC voltage, the AC voltage having a plurality of cycles per predetermined time period;
    a controller for generating a predetermined periodic duty ratio control signal corresponding to a rotation request signal for rotating the fan motor inputted by a user; and
    a switching device electrically connected to the power supply and to the fan motor, the switching device controlling an average RPM (revolution per minute) of the fan motor by controlling the AC voltage applied to the fan motor according to the periodic duty ratio control signal, wherein the periodic duty ratio control signal controls a turn-on time and a turn-off time of the switching device,
    wherein the switching device stops applying the AC voltage to the fan motor for at least one of the plurality of cycles during a turn-off time of the switching device.

6. The apparatus of claim 5, wherein the switching device is an inverter.

7. The apparatus of claim 5, wherein the switching device is a triac.

8. The apparatus of claim 7, wherein the periodic duty ratio control signal turns on the triac during a first pre-set time and turns off the triac during a second pre-set time.

9. The apparatus of claim 7, wherein when a rotation request signal for increasing the RPM of the fan motor is inputted, the controller generates a new periodic duty ratio control signal for lengthening the turn-on time of the triac and shortening the turn-off time of the triac, and when a rotation request signal for reducing the RPM of the fan motor is inputted, the controller generates another new periodic duty ratio control signal for shortening the turn-on time of the triac and lengthening the turn-off time of the triac.

10. The apparatus of claim 9, wherein the turn-off time of the triac is not greater than one second.

11. The apparatus of claim 10, wherein the controller controls the average RPM of the fan motor while the triac is turned off and the average RPM of the fan motor while the triac is turned on, thereby extending the speed control range of the fan motor.

12. The apparatus of claim 11, further comprising:
    a memory for storing the predetermined duty ratio control signal.

13. The apparatus of claim 12, wherein the fan motor is rotated by inertia while the triac is turned off and the fan motor is rotated by the AC voltage while the triac is turned on.

14. The apparatus of claim 1, wherein the pre-set duty ratio is less than one (1).

15. The apparatus of claim 14, wherein the pre-set duty ratio is equal to or higher than one half.

16. The apparatus of claim 15, wherein the pre-set duty ratio is equal to two-thirds.

17. The apparatus of claim 5, wherein the predetermined periodic duty ratio control signal has a duty ratio, and the duty ratio is less than one (1).

18. The apparatus of claim 17, wherein the duty ratio is equal to or higher than one half.

19. The apparatus of claim 18, wherein the duty ratio is equal to two-thirds.

20. A method for controlling a speed of a motor, comprising the steps of:
  providing by a power supply an AC voltage having a plurality of cycles per predetermined time period;
  generating a predetermined periodic duty ratio control signal to turn on and off a switching device connected to the motor and the power supply; and
  connecting the motor to or disconnecting the motor from the power supply based on the predetermined periodic duty ratio control signal, thereby extending a range of an average RPM (revolution per minute) of the motor, wherein the step of disconnecting the motor from the power supply includes stopping applying the AC voltage by the switching device to the motor for at least one of the plurality of cycles during a turn-off time of the switching device.

21. The method of claim 20, wherein the predetermined duty ratio control signal has a duty ratio, and the duty ratio is less than one (1).

22. The method of claim 21, wherein the duty ratio is equal to or higher than one half.

23. The method of claim 22, wherein the duty ratio is equal to two-thirds.

24. The apparatus of claim 1, wherein the switching device applies the AC voltage to the HIM for each of the plurality of cycles during a turn-on time of the periodic pre-set duty ratio of the switching device.

25. The apparatus of claim 1, wherein the AC voltage has a substantially constant peak-to-peak amplitude in each of the cycles, and the AC voltage provided by the power supply, the AC voltage applied to the switching device, and the AC voltage applied to the HIM during a turn-on time of the periodic pre-set duty ratio of the switching device have substantially the same constant peak-to-peak amplitude.

26. The apparatus of claim 5, wherein the switching device applies the AC voltage to the HIM for each of the plurality of cycles during a turn-on time of the switching device.

27. The apparatus of claim 5, wherein the AC voltage has a substantially constant peak-to-peak amplitude in each of the cycles, and the AC voltage provided by the power supply, the AC voltage applied to the switching device, and the AC voltage applied to the HIM during a turn-on time of the switching device have substantially the same constant peak-to-peak amplitude.

28. The method of claim 20, wherein the step of disconnecting the motor from the power supply includes applying the AC voltage by the switching device to the motor for each of the plurality of cycles during a turn-off time of the switching device.

29. The method of claim 20, wherein the AC voltage has a substantially constant peak-to-peak amplitude in each of the cycles, and the AC voltage provided by the power supply, the AC voltage applied to the switching device, and the AC voltage applied to the motor during a turn-on time of the switching device have substantially the same constant peak-to-peak amplitude.

* * * * *